(12) United States Patent
Shimizu et al.

(10) Patent No.: US 9,637,414 B2
(45) Date of Patent: May 2, 2017

(54) DIELECTRIC PORCELAIN COMPOSITION AND DIELECTRIC ELEMENT HAVING THE SAME

(71) Applicant: TAIYO YUDEN CO., LTD., Taito-ku, Tokyo (JP)

(72) Inventors: Hiroyuki Shimizu, Takasaki (JP); Yutaka Doshida, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/195,979

(22) Filed: Jun. 28, 2016

(65) Prior Publication Data

US 2016/0376197 A1 Dec. 29, 2016

(30) Foreign Application Priority Data

Jun. 29, 2015 (JP) .................................. 2015-130140
Apr. 15, 2016 (JP) .................................. 2016-082482

(51) Int. Cl.
| | | |
|---|---|---|
| *C04B 35/475* | (2006.01) | |
| *H01G 4/12* | (2006.01) | |
| *H01G 4/008* | (2006.01) | |
| *B32B 15/00* | (2006.01) | |
| *C04B 35/626* | (2006.01) | |

(52) U.S. Cl.
CPC ............ *C04B 35/475* (2013.01); *B32B 15/00* (2013.01); *C04B 35/62675* (2013.01); *H01G 4/008* (2013.01); *H01G 4/1227* (2013.01); *C04B 2235/3201* (2013.01); *C04B 2235/3215* (2013.01); *C04B 2235/3251* (2013.01); *C04B 2235/3281* (2013.01); *C04B 2235/3298* (2013.01); *C04B 2235/442* (2013.01); *C04B 2235/444* (2013.01); *C04B 2235/604* (2013.01); *C04B 2235/77* (2013.01)

(58) Field of Classification Search
CPC ............................ C04B 35/475; H01G 4/1227
See application file for complete search history.

(56) References Cited

U.S. PATENT DOCUMENTS

| | | | | |
|---|---|---|---|---|
| 8,791,625 B2 * | 7/2014 | Kounga Njiwa | ..... | C04B 35/462 252/62.9 PZ |
| 2012/0098386 A1 * | 4/2012 | Kounga Njiwa | ..... | C04B 35/462 310/311 |
| 2016/0163457 A1 * | 6/2016 | Yoon | ..... | H01G 4/1227 361/301.4 |

FOREIGN PATENT DOCUMENTS

| | | |
|---|---|---|
| JP | 2002220280 A | 8/2002 |
| JP | 2011230962 A | 11/2011 |
| JP | 5586621 B2 | 8/2014 |
| WO | 2010054994 A1 | 5/2010 |

OTHER PUBLICATIONS

Dittmer et al., Lead-free high-temperature dielectrics with wide operational range, Journal of Applied Physics, 109, 034107, published online Feb. 9, 2011.
Jo et al., CuO as a sintering additive for (Bi1/2Na1/2)TiO3—BaTiO3—(K0.5Na0.5)NbO3 lead-free piezoceramics, Journal of European Ceramics Society, 31, 2107-2117, available online May 31, 2011.
Nagata et al., Fabrication and Electrical Properties of Multilayer Ceramic Actuator Using Lead-Free (Bi1/2K1/2)TiO3, Japanese Journal of Applied Physics, 52, 09KD05, published online Sep. 20, 2013.

* cited by examiner

*Primary Examiner* — Karl Group
(74) *Attorney, Agent, or Firm* — Law Office of Katsuhiro Arai

(57) ABSTRACT

A dielectric porcelain composition with a sintering density of 93% or above, is expressed by the composition formula below: $100[1-x(0.94Bi_{1/2}Na_{1/2}TiO_3-0.06BaTiO_3)-xK_{0.5}Na_{0.5}NbO_3]+\alpha CuO+\beta LiF$ (wherein x is between 0.14 and 0.28, and $\alpha$ and $\beta$ meet either (I) $\alpha$ is between 0.4 and 1.5, and $\beta$ is between 0 and 2.4, or (II) $\alpha$ is between 0 and 1.5, and $\beta$ is between 0.2 and 2.4). The dielectric porcelain composition is Pb-free and can be sintered at low temperature, as well as a dielectric element having such composition.

4 Claims, No Drawings

DIELECTRIC PORCELAIN COMPOSITION AND DIELECTRIC ELEMENT HAVING THE SAME

BACKGROUND

Field of the Invention

The present invention relates to a dielectric porcelain composition and dielectric element having such composition.

Description of the Related Art

Electronic components are used in various fields in recent years, and in some cases they are used in severe environments. For example, electronic components used for such applications as operation of power devices based on SiC or GaN that are drawing attention as onboard devices, noise elimination in the engine compartments of cars, etc., are required to have a specific dielectric constant with good temperature properties even at high temperatures such as 200 to 350° C. However, barium titanate, which is widely used as a dielectric porcelain composition to constitute capacitors, cannot meet the aforementioned requirement because its Curie temperature is near 130° C. and therefore its specific dielectric constant drops significantly in a temperature range of 150° C. or above.

Materials containing Pb have traditionally been used in such high-temperature applications. For example, a dielectric porcelain composition comprised of two components, such as one expressed by $PbTiO_3$—$BaZrO_3$, is such that its specific dielectric constant is relatively less dependent on temperature until around 300° C. because the Curie point of $PbTiO_3$ is around 490° C. On the other hand, the specific dielectric constant of $Pb(Zr_{0.95}Ti_{0.05})O_3$ (PLZT), containing La, exhibits good bias dependence at high temperature because of the material's anti-ferroelectricity which is different from that of barium titanate mentioned above. These materials were invented in light of the problems presented by barium titanate, but Pb contained in such compositions is an environmentally hazardous substance whose use is not desired. Accordingly, there is a demand for Pb-free materials offering good properties even in a high temperature range.

Lead-free bismuth niobate piezoelectric porcelain compositions are known (see Patent Literatures 1 to 3, for example). However, these patent literatures do not disclose reducing the temperature dependence of the specific dielectric constant of the dielectric porcelain composition over a wide temperature range. Furthermore, in the inventions in Patent Literatures 2 and 3, the ceramic sintering temperature is high at 1050° C. or above.

When a lead-free bismuth niobate composition with a high Curie point and good temperature properties is considered as a material for the dielectric layers of a laminate capacitor, desirably silver palladium alloy is used for the internal electrodes. This simplifies the process because sintering can be done in an atmospheric ambience unlike when Ni electrodes are used. There is also a cost advantage because the sintering temperature is low. The cost and sintering temperature of a silver palladium alloy (Ag—Pd) electrode vary depending on its silver (Ag) and palladium (Pd) ratio (Ag/Pd), but desirably the Ag ratio (Ag/Pd) is 7/10 or higher when cost is considered.

Simultaneous sintering of bismuth niobate BNT-BT-KNN $(Bi_{1/2}Na_{1/2}TiO_3$—$BaTiO_3$—$K_{0.5}Na_{0.5}NbO_3)$ with Pd electrodes has been reported. As for Ag electrodes, a study by Nagata et al. (Non-patent Literature 1) shows that sintering BKT $(Bi_{0.5}K_{0.5}TiO_3)$ at 1050° C. causes Bi and Ag to react. Accordingly, sintering at temperatures below 1050° C. is desired for Ag—Pd electrodes offering cost advantage, in order to prevent reaction between Bi and Ag. This way, electrodes having an Ag/Pd ratio of 7/3, 8/2, 9/1, etc., also become feasible. Some kind of sintering auxiliary is needed to lower the sintering temperature. In Non-patent Literature 2, broadening of the dielectric constant with an increase in the KNN ratio of BNT-BT-KNN is reported. This means that the rate of change in capacitance relative to temperature change is small. However, increasing the KNN ratio causes the sintering temperature to rise and the relative density of the sintered body to drop, which is a problem.

BACKGROUND ART LITERATURES

[Patent Literature 1] Japanese Patent Laid-open No. 2002-220280
[Patent Literature 2] Japanese Patent Laid-open No. 2011-230962
[Patent Literature 3] Japanese Patent No. 5586621
[Non-patent Literature 1] Nagata et al., Japanese Journal of Applied Physics, 52 09KD05 (2013)
[Non-patent Literature 2] Dittmer et al., Journal of Applied Physics, 109, 034107, 2011
[Non-patent Literature 3] Journal of European Ceramics Society, 31 (2011) 2107-2117

SUMMARY

Increasing the KNN ratio improves the temperature properties of the specific dielectric constant, but at the same time it makes the ceramic difficult to sinter and causes the sintering density to drop, which is a problem. Although Pd electrode compositions are feasible, Ag—Pd electrode compositions are desired because the cost of Pd is high, where the higher the Ag content, the better because the cost is lower (Ag/Pd=70/30, for example). However, a higher Ag ratio (Ag/Pd=90/10) means that the sintering temperature must be reduced, which increases the technical difficulty. Also according to Non-patent Literature 1, preferably sintering is performed at below 1050° C. because Ag reacts easily with Bi. In light of the above, an object of the present invention is to provide a dielectric porcelain composition that is Pb-free and can be sintered at low temperature, as well as a dielectric element having such composition.

Any discussion of problems and solutions involved in the related art has been included in this disclosure solely for the purposes of providing a context for the present invention, and should not be taken as an admission that any or all of the discussion were known at the time the invention was made.

After studying in earnest, the inventors of the present invention completed the present invention.

The dielectric porcelain composition proposed by the present invention is expressed by the general formula (1) below:

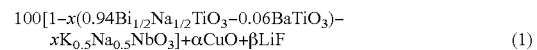

$$100[1-x(0.94Bi_{1/2}Na_{1/2}TiO_3-0.06BaTiO_3)-xK_{0.5}Na_{0.5}NbO_3]+\alpha CuO+\beta LiF \quad (1)$$

Here, x is between 0.14 and 0.28. α and β meet either the condition (I) α is between 0.4 and 1.5, and β is between 0 and 2.4, or (II) α is between 0 and 1.5, and β is between 0.2 and 2.4. The dielectric porcelain composition proposed by the present invention has a sintering density of 93% or above. In some embodiments, the dielectric porcelain composition (sintered) consists essentially of or consists of the composition of formula (1) wherein inevitable impurities may be included.

In another embodiment of the present invention, a laminated dielectric element having a laminate, which in turn comprises dielectric layers made of the aforementioned dielectric porcelain composition and internal electrode layers made of silver palladium alloy, is provided. Here, the composition of silver palladium alloy is 65 to 90 percent by weight of silver, and palladium accounting for the rest.

Preferably the laminate is sintered at below 1050° C. With the dielectric element, the rate of change in capacitance due to temperature is 30% or below for $\Delta C_{400° C.}/C_{25° C.}$, and 50% or below for $\Delta C_{peak}/C_{25° C.}$. The definitions of $\Delta C_{400° C.}/C_{25° C.}$ and $\Delta C_{peak}/C_{25° C.}$ are described later. Also with the dielectric element, preferably the time constant (RC constant) is 200 to 350 sec. The definition of RC constant is also described later.

According to the present invention, a dielectric porcelain composition that can be sintered at low temperatures below 1050° C. and also simultaneously with Ag/Pd=7/3 electrodes, etc., without using environmentally hazardous heavy metal elements such as Pb and Sb, is provided. A dielectric element having such dielectric porcelain composition as its dielectric layers exhibits good temperature properties with a small rate of change in specific dielectric constant over a wide temperature range (such as −55 to 400° C.). Accordingly, dielectric elements having the dielectric porcelain composition proposed by the present invention are ideal for onboard applications where they must be used in high temperature ranges, or as smoothing capacitors for power devices using SiC or GaN wideband gap semiconductor materials that are required to support even higher temperature ranges.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

DETAILED DESCRIPTION OF EMBODIMENTS

The dielectric porcelain composition proposed by the present invention has a composition expressed by the general formula (1) above.

x, which is a value reflecting the ratio of BNT-BT and KNN, is between 0.14 and 0.28 under the present invention.

α and β are values reflecting the amount of CuO and LiF added, respectively. Only one of CuO and LiF needs to be contained, and α is zero when CuO is not contained, and β is zero when LiF is not contained.

If LiF is not contained (i.e., β=0), the minimum value of α is 0.4 or more. The maximum value of α is 1.5 regardless of whether or not LiF is contained. If CuO is not contained (i.e., α=0), the minimum value of β is 0.2 or more. The maximum value of β is 2.4 regardless of whether or not CuO is contained. By summarizing the above, the condition (I) or (II) below is derived regarding α and β:

Condition (I): α is between 0.4 and 1.5, and β is between 0 and 2.4.

Condition (II): α is between 0 and 1.5, and β is between 0.2 and 2.4.

The sintering density improves when CuO or LiF exists or the two coexist in a manner meeting the ranges of α and β above.

The dielectric porcelain composition proposed by the present invention has a sintering density of 93% or above. The measuring method for sintering density is described in the section of Examples. Ways to improve the sintering density normally include raising the sintering temperature, but under the dielectric porcelain composition proposed by the present invention, the aforementioned sintering density can be achieved by performing sintering at such sintering temperatures as below 1050° C., which is a great advantage.

The manufacturing method is explained and embodiments of the dielectric porcelain composition proposed by the present invention are cited below. It should be noted that the following manufacturing method is only an example and is not intended to limit in any way the method in which the dielectric porcelain composition proposed by the present invention is manufactured.

First, material powders containing the respective metal elements are prepared as the starting materials for producing a dielectric porcelain composition. The material powders include powders of oxides and carbonates of the respective metal elements, such as powders of bismuth oxide ($Bi_2O_3$), sodium carbonate ($Na_2CO_3$), potassium carbonate ($K_2CO_3$), barium carbonate ($BaCO_3$), titanium oxide ($TiO_2$), niobium oxide ($Nb_2O_5$), copper oxide (CuO), lithium fluoride (LiF), and the like.

These material powders are weighed to match the composition of the dielectric porcelain composition (sintered body) finally targeted. Next, the weighed material powders are wet-mixed in a ball mill, etc. Then, the mixture obtained through the wet-mixing is calcined to obtain a calcined product. Here, calcination is normally performed in air. Also, preferably the calcination temperature is 850 to 900° C., and preferably the calcination time is 1 to 8 hours.

The obtained calcined product is wet-pulverized in a ball mill, etc., and then dried to obtain a calcined powder. Next, the obtained calcined powder is pressed after adding a small amount of binder (acryl monomer) to it, to obtain a compact. Here, preferably the compacting pressure is approx. 4 to 6 t/cm², although the specific pressure varies depending on the state of the powder. The shape of the compact is not limited in any way, and it may be a disk-shaped compact with a flat area diameter of 12 mm and thickness of 1 mm or so, for example.

Then, the obtained compact is sintered to obtain a sample of dielectric porcelain composition. Here, sintering is normally performed in air. Also, the sintering temperature is below 1050° C., or preferably 960 to 1040° C., and the sintering time is preferably 2 to 10 hours. At this time, a compact with a sintering density of 93% or above must be obtained.

Silver or other metal electrodes may be formed on both sides of the obtained sample of dielectric porcelain composition. The electrode forming method is not limited in any way, and examples include vapor deposition, baking and electroless plating, among others.

The dielectric porcelain composition proposed by the present invention may have a dielectric element as dielectric layers, and such dielectric element also constitutes an embodiment of the present invention. As an example of the dielectric element proposed by the present invention, a laminated dielectric element is explained, along with its manufacturing method. This dielectric element has a laminate of rectangular solid shape, as well as a pair of terminal electrodes formed on the opposing end faces of this laminate, respectively.

The laminate comprises, among others, a base body constituted by dielectric layers and internal electrode layers (electrode layers) stacked alternately with each other, and a pair of protective layers provided in a manner sandwiching the base body from both its end faces in the stacking direction (vertical direction).

The dielectric layers are layers made of the aforementioned dielectric porcelain composition. The thickness of one dielectric layer is arbitrary, but examples include 0.1 to 100 μm.

The internal electrode layers are provided in parallel with each other. In the base body, internal electrode layers formed in such a way that one end is exposed at one end of the laminate, and internal electrode layers formed in such a way that one end is exposed at the other end of the laminate, are provided alternately in parallel.

For the material of internal electrode layers, silver palladium alloy is used. Under the present invention, silver palladium alloy consists of 65 to 90 percent by weight of silver, and palladium accounting for the rest. The higher content of silver provides cost advantage.

The ends of the internal electrode layer exposed on one end face and the other end face of the laminate are connected to the respective terminal electrodes. This way, the terminal electrodes are electrically connected to the internal electrode layers, respectively. These terminal electrodes are not limited in their material in any way, and may be constituted by any conductive material whose primary component is Ag, Au, Cu, etc. The thickness of the terminal electrodes is set as deemed appropriate according to the application, size of the laminated dielectric element, etc., and may be 10 to 50 μm, for example.

With the dielectric element, preferably the rate of change in capacitance at high temperature is 30% or below for $\Delta C_{400°\ C.}/C_{25°\ C.}$, and 50% or below for $\Delta C_{peak}/C_{25°\ C.}$.

The rate of change due to temperature $\Delta C_{400°\ C.}/C_{25°\ C.}$ is a value obtained by dividing the difference between the capacitance at 400° C. and capacitance at 25° C., by the capacitance at 25° C. The rate of change due to temperature $\Delta C_{peak}/C_{25°\ C.}$ is a value obtained by dividing the difference between the maximum value of capacitance at −55 to 400° C. and capacitance at 25° C., by the capacitance at 25° C. To be specific, when the capacitance at 400° C. is given by $C_{400°\ C.}$, capacitance at 25° C. (room temperature) is given by $C_{25°\ C.}$, and maximum value of capacitance in a measurement range of −55 to 400° C. is given by $C_{peak}$, each rate of change due to temperature is calculated as follows based on the measured values of these capacitances:

$$\Delta C_{400°\ C.}/C_{25°\ C.}=(C_{400°\ C.}-C_{25°\ C.})/C_{25°\ C.}$$

$$\Delta C_{peak}/C_{25°\ C.}=(C_{peak}-C_{25°\ C.})/C_{25°\ C.}$$

These capacitances are measured for the dielectric element on which the electrodes have been formed as described above, using an LCR meter (Hewlett Packard 4192A or Agilent E4980A). The measurement frequency is 1 kHz, and the measurement temperature range is −55 to 400° C.

Preferably time constant RC of the dielectric element at high temperature (such as 150° C.) is 200 to 350 sec. The time constant was evaluated at 150° C. The impression voltage was impressed so that the electric field intensity would become 5 kV/mm. The capacitance was measured at 1 V.

The foregoing explained the dielectric porcelain composition and dielectric element in this embodiment, and because this dielectric porcelain composition exhibits good DC bias properties when high electric field is impressed, it can be favorably used for medium to high-voltage capacitors whose rated voltage is relatively high, for example. Also, it should be noted that the present invention is not limited to the aforementioned embodiment. The dielectric element proposed by the present invention only needs to have a laminate structure constituted by dielectric layers made of the aforementioned dielectric porcelain composition and internal electrode layers made of silver palladium of the aforementioned composition, and prior art may be referenced as deemed appropriate for its specific shape, manufacturing method, etc.

EXAMPLES

The present invention is explained more specifically below using examples. It should be noted, however, that the present invention is not limited to the embodiments described in these examples.

To produce a dielectric porcelain composition, powders of bismuth oxide ($Bi_2O_3$), sodium carbonate ($Na_2CO_3$), potassium carbonate ($K_2CO_3$), barium carbonate ($BaCO_3$), titanium oxide ($TiO_2$), niobium oxide ($Nb_2O_5$), copper oxide (CuO), and lithium fluoride (LiF) were prepared as the starting materials.

Then, the material powders were weighed so that the sintered dielectric porcelain composition (sintered body) would meet the general formula (1) above.

Next, the weighed material powders were wet-mixed in a ball mill. Then, the mixture obtained through the wet-mixing was calcined at 900° C. for 3 hours to obtain a calcined product.

The obtained calcined product was wet-pulverized in a ball mill and then dried to obtain a calcined powder. Next, the obtained calcined powder was pressed after adding a small amount of binder to it, to obtain a disk-shaped compact with a diameter of 12 mm and thickness of 1 mm (Manufacturing Examples 1 to 13).

Then, the obtained compact was sintered for 3 hours in air at the sintering temperature below, to obtain a sample of a dielectric porcelain composition. The obtained sample of dielectric porcelain composition was measured for sintering density. The sintering density was measured according to JIS R 1634:1998.

The composition, sintering temperature, and sintering density of each sample were as follows (shown in Table 1 below). It is required that a composition with a sintering density of 93% or above be obtained at a sintering temperature below 1050° C. It should be noted that the manufacturing example numbers preceded by an asterisk (*) represent comparative examples of the present invention.

TABLE 1

|  | x | α | β | Sintering temperature | Sintering density % |
|---|---|---|---|---|---|
| * Manufacturing Example 1 | 0.10 | 0 | 0 | 1100° C. | 94.3 |
| * Manufacturing Example 2 | 0.12 | 0 | 0 | 1100° C. | 94.1 |
| * Manufacturing Example 3 | 0.14 | 0 | 0 | 1100° C. | 94.5 |
| * Manufacturing Example 4 | 0.18 | 0 | 0 | 1100° C. | 94.9 |
| * Manufacturing Example 5 | 0.24 | 0 | 0 | 1130° C. | 93.0 |
| * Manufacturing Example 6 | 0.12 | 1 | 0 | 1000° C. | 97.2 |
| Manufacturing Example 7 | 0.14 | 1 | 0 | 1000° C. | 96.3 |
| Manufacturing Example 8 | 0.18 | 1 | 0 | 1000° C. | 95.5 |

TABLE 1-continued

|  | x | α | β | Sintering temperature | Sintering density % |
|---|---|---|---|---|---|
| Manufacturing Example 9 | 0.24 | 1 | 0 | 1000° C. | 97.3 |
| * Manufacturing Example 10 | 0.12 | 0 | 1 | 1040° C. | 93.0 |
| Manufacturing Example 11 | 0.14 | 0 | 1 | 1040° C. | 93.3 |
| Manufacturing Example 12 | 0.18 | 0 | 1 | 1040° C. | 93.2 |
| Manufacturing Example 13 | 0.24 | 0 | 1 | 1040° C. | 93.1 |

Next, laminated dielectric elements having the dielectric porcelain composition proposed by the present invention were manufactured (Manufacturing Examples 14 to 34). The dielectric elements each have a laminate of rectangular solid shape, as well as a pair of terminal electrodes formed on the opposing end faces of this laminate, respectively.

The laminate was comprised of: a base body constituted by internal electrode layers (electrode layers) stacked alternately with dielectric layers in such a way that a dielectric layer was present between each pair of internal electrode layers, and a pair of protective layers provided in a manner sandwiching this base body from the both end faces in the stacking direction (vertical direction). In the base body, the dielectric layers and internal electrode layers were stacked alternately with each other. Here, a dielectric porcelain composition meeting the general formula (1) above was used for the dielectric layers.

The thickness of one dielectric layer was set to 8 μm, and ten layers were stacked in these manufacturing examples. As for the internal electrode layers, those formed in such a way that one end was exposed at one end of the laminate, and others formed in such a way that one end was exposed at the other end of the laminate, were provided alternately in parallel. In these manufacturing examples, silver palladium alloy (70 percent by weight of silver, plus palladium accounting for the rest) was used for the material of internal electrode layers.

At both ends of the laminate, terminal electrodes were formed in a manner contacting the ends of the aforementioned internal electrode layers, respectively. This way, the terminal electrodes and internal electrode layers were electrically connected. In these manufacturing examples, silver was used for the material of the terminal electrodes. The thickness of the terminal electrodes was set to 100 μm.

A laminated dielectric element was manufactured to the aforementioned design. It was manufactured by preparing a slurry containing the aforementioned calcined powder, using this slurry to prepare green sheets, separately preparing a paste containing internal electrode material, and then printing this paste onto the green sheets. The printed green sheets were stacked, pressure-welded and cut, and then sintered for 2 hours in air at the specified sintering temperature. Thereafter, silver paste was baked to form terminal electrodes. A dielectric element was thus obtained.

The sintering temperature was as follows.

It was 1100° C. in Manufacturing Examples 14 to 20 where α=β=0, 1000° C. in Manufacturing Examples 21 to 27 where α=1 and β=0, and 1040° C. in Manufacturing Examples 28 to 34 where α=0 and β=1. By sintering at these temperatures, all dielectric layers, or dielectric porcelain compositions, exhibited a sintering density of 93% or above, except in Manufacturing Example 20. In Manufacturing Example 20, a sintering density high enough to justify measuring the following electrical properties was not reached.

The obtained dielectric elements were measured for the rate of change in capacitance due to temperature and the time constant.

The composition of each manufacturing example and its rate of change in capacitance due to temperature were as follows (shown in Table 2 below). $\Delta C_{400° C.}/C_{25° C.}$ and $\Delta C_{peak}/C_{25° C.}$ were measured as the rates of change in capacitance due to temperature. Results consisting of a sintering temperature of below 1050° C., and rates of change due to temperature $\Delta C_{400° C.}/C_{25° C.}$ (referred to as "T1" below) of 30% or below, and $\Delta C_{peak}/C_{25° C.}$ (referred to as "T2" below) of 50% or below, are required. Also, the time constant (RC constant, in units of sec) of each manufacturing example was measured and the following results were obtained. Desirably the RC constant is 200 to 350 sec.

TABLE 2

|  | x | α | β | T1 (%) | T2 (%) | RC |
|---|---|---|---|---|---|---|
| * Manufacturing Example 14 | 0.10 | 0 | 0 | 0.1 | 47.6 | 245 |
| * Manufacturing Example 15 | 0.12 | 0 | 0 | −3.2 | 40.0 | 220 |
| * Manufacturing Example 16 | 0.14 | 0 | 0 | −6.5 | 35.1 | 198 |
| * Manufacturing Example 17 | 0.18 | 0 | 0 | −9.2 | 31.3 | 181 |
| * Manufacturing Example 18 | 0.24 | 0 | 0 | −48.4 | 20.0 | 63 |
| * Manufacturing Example 19 | 0.28 | 0 | 0 | −20.1 | 17.3 | 52 |
| * Manufacturing Example 20 | 0.30 | 0 | 0 | Could not be measured due to low density. |  | 45 |
| * Manufacturing Example 21 | 0.10 | 1 | 0 | 8.2 | 123.0 | 340 |
| * Manufacturing Example 22 | 0.12 | 1 | 0 | 5.7 | 109.7 | 387 |
| * Manufacturing Example 23 | 0.14 | 1 | 0 | −10.2 | 49.2 | 349 |
| * Manufacturing Example 24 | 0.18 | 1 | 0 | −25.0 | 45.8 | 331 |
| * Manufacturing Example 25 | 0.24 | 1 | 0 | −27.5 | 44.9 | 280 |
| * Manufacturing Example 26 | 0.28 | 1 | 0 | −1.8 | 35.2 | 244 |
| * Manufacturing Example 27 | 0.30 | 1 | 0 | Could not be measured due to production of abnormal phase. |  | 226 |
| * Manufacturing Example 28 | 0.10 | 0 | 1 | 9.5 | 119.3 | 390 |
| * Manufacturing Example 29 | 0.12 | 0 | 1 | 6.2 | 111.9 | 340 |
| * Manufacturing Example 30 | 0.14 | 0 | 1 | −15.6 | 10.9 | 304 |
| * Manufacturing Example 31 | 0.18 | 0 | 1 | −25.2 | 25.2 | 289 |
| * Manufacturing Example 32 | 0.24 | 0 | 1 | −28.5 | 42.6 | 243 |
| * Manufacturing Example 33 | 0.28 | 0 | 1 | −2.3 | 33.9 | 210 |
| * Manufacturing Example 34 | 0.30 | 0 | 1 | Could not be measured due to production of abnormal phase. |  | 180 |

In the above, the "abnormal phase" is a type of secondary phase which is abnormal to the extent that measurement of T1 and T2 is hindered.

Table 3 below is a table combining the results shown in Tables 1 and 2 and shows the evaluation of each formula of the composition (* indicates unsatisfactory examples). As can be seen from Table 3, when x was in a range of 0.14 to 0.28, and at least one of α and β was not zero (in some embodiments, at least one of α and β is 1±0.5), regardless of the sintering temperature (i.e., even at a low sintering temperature such as 1000° C.), all of the sintering density, T1, T2, and R C were satisfactory.

TABLE 3

| Ex. | Formula (1) | | | Sintering Temp. (° C.) | Sintering Density (%) | Dielectric element of laminated type | | |
|---|---|---|---|---|---|---|---|---|
| | X | α | β | | | T1 (%) | T2 (%) | R C |
| *1, *14 | 0.10 | 0 | 0 | 1100 | 94.3 | 0.1 | 47.6 | 245 |
| *2, *15 | 0.12 | 0 | 0 | 1100 | 94.1 | −3.2 | 40.0 | 220 |
| *3, *16 | 0.14 | 0 | 0 | 1100 | 94.5 | −6.5 | 35.1 | 198 |
| *4, *17 | 0.18 | 0 | 0 | 1100 | 94.9 | −9.2 | 31.3 | 181 |
| *5 | 0.24 | 0 | 0 | 1130 | 93.0 | — | — | — |
| *18 | 0.24 | 0 | 0 | 1100 | 93≤ | −48.4 | 20.0 | 63 |
| *19 | 0.28 | 0 | 0 | 1100 | 93≤ | −20.1 | 17.3 | 52 |
| *20 | 0.30 | 0 | 0 | 1100 | 93> | Could not be measured due to low density | | 45 |
| *21 | 0.10 | 1 | 0 | 1000 | 93≤ | 8.2 | 123.0 | 340 |
| *6, *22 | 0.12 | 1 | 0 | 1000 | 97.2 | 5.7 | 109.7 | 387 |
| 7, 23 | 0.14 | 1 | 0 | 1000 | 96.3 | −10.2 | 49.2 | 349 |
| 8, 24 | 0.18 | 1 | 0 | 1000 | 95.5 | −25.0 | 45.8 | 331 |
| 9, 25 | 0.24 | 1 | 0 | 1000 | 97.3 | −27.5 | 44.9 | 280 |
| 26 | 0.28 | 1 | 0 | 1000 | 93≤ | −1.8 | 35.2 | 244 |
| *27 | 0.30 | 1 | 0 | 1000 | 93≤ | Could not be measured due to production of abnormal phase | | 226 |
| *28 | 0.10 | 0 | 1 | 1040 | 93≤ | 9.5 | 119.3 | 390 |
| *10, *29 | 0.12 | 0 | 1 | 1040 | 93.0 | 6.2 | 111.9 | 340 |
| 11, 30 | 0.14 | 0 | 1 | 1040 | 93.3 | −15.6 | 10.9 | 304 |
| 12, 31 | 0.18 | 0 | 1 | 1040 | 93.2 | −25.2 | 25.2 | 289 |
| 13, 32 | 0.24 | 0 | 1 | 1040 | 93.1 | −28.5 | 42.6 | 243 |
| 33 | 0.28 | 0 | 1 | 1040 | 93≤ | −2.3 | 33.9 | 210 |
| *34 | 0.30 | 0 | 1 | 1040 | 93≤ | Could not be measured due to production of abnormal phase | | 180 |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-130140, filed Jun. 29, 2015, and No. 2016-082482, filed Apr. 15, 2016, each disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A dielectric porcelain composition with a sintering density of 93% or above, expressed by a composition formula below:

$100[1-x(0.94Bi_{1/2}Na_{1/2}TiO_3-0.06BaTiO_3)-xK_{0.5}Na_{0.5}NbO_3]+\alpha CuO+\beta LiF$ (wherein x is from 0.14 and 0.28, and α and β meet either (I) α is from 0.4 to 1.5 and β is from 0 to 2.4, or (II) α is from 0 to 1.5 and β is from 0.2 to 2.4).

2. A dielectric element of laminated type having a laminate constituted by dielectric layers made of a dielectric porcelain composition according to claim 1 and internal electrode layers made of silver palladium alloy, wherein a composition of silver palladium alloy is 65 to 90 percent by weight of silver and palladium accounting for the remainder.

3. A dielectric element according to claim 2 whose $\Delta C_{400°\,C.}/C_{25°\,C.}$ is 30% or below and whose $\Delta C_{peak}/C_{25°\,C.}$ is 50% or below, wherein $\Delta C_{400°\,C.}/C_{25°\,C.}$ is a value obtained by dividing a difference between a capacitance at 400° C. and a capacitance at 25° C., by the capacitance at 25° C., and $\Delta C_{peak}/C_{25°\,C.}$ is a value obtained by dividing a difference between a maximum value of capacitance at −55 to 400° C. and a capacitance at 25° C., by the capacitance at 25° C.

4. A dielectric element according to claim 3 whose time constant RC measured at 150° C., electric field intensity of 5 kV/mm, and capacitance of 1 V, is 200 to 350 sec.

* * * * *

UNITED STATES PATENT AND TRADEMARK OFFICE
CERTIFICATE OF CORRECTION

PATENT NO. : 9,637,414 B2
APPLICATION NO. : 15/195979
DATED : May 2, 2017
INVENTOR(S) : Hiroyuki Shimizu and Yutaka Doshida It is certified that error appears in the above-identified patent and that said Letters Patent is hereby corrected as shown below:

In the Claims

At Column 10, in Claim 1, Line 26, in "0.14 and 0.28", please delete "and" and insert therefor --to--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*